United States Patent
Okino et al.

(10) Patent No.: US 6,714,325 B1
(45) Date of Patent: Mar. 30, 2004

(54) IMAGE READING DEVICE

(75) Inventors: Yoshiharu Okino, Kanagawa (JP); Masaaki Konno, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/511,907

(22) Filed: Feb. 23, 2000

(30) Foreign Application Priority Data

Feb. 23, 1999 (JP) ............................................. 11-044319

(51) Int. Cl.⁷ ................................................. H04N 2/04
(52) U.S. Cl. ........................ 358/497; 358/505; 358/513; 358/514; 358/506; 358/509
(58) Field of Search ................................. 358/474, 506, 358/487, 497, 496, 472, 484, 482, 483, 505, 513, 514, 509

(56) References Cited

U.S. PATENT DOCUMENTS

| | | | | | |
|---|---|---|---|---|---|
| 5,363,217 A | * | 11/1994 | Keightley | ................... | 358/506 |
| 5,640,264 A | * | 6/1997 | Maeda et al. | ................ | 359/204 |
| 5,663,782 A | * | 9/1997 | Salto | ........................... | 355/37 |
| 5,703,674 A | * | 12/1997 | Nishio | ......................... | 355/46 |
| 5,986,777 A | * | 11/1999 | Stephenson | ................. | 358/506 |
| 6,081,346 A | * | 6/2000 | Terajima et al. | ............ | 358/296 |
| 6,101,006 A | * | 8/2000 | Bryant | ....................... | 358/506 |
| 6,122,076 A | * | 9/2000 | Shiota | ........................ | 358/447 |

* cited by examiner

Primary Examiner—Kimberly Williams
Assistant Examiner—Negussie Worku
(74) Attorney, Agent, or Firm—Sughrue Mion, PLLC

(57) ABSTRACT

An image reading device in which an image can be read efficiently and at high speed and with high image quality with little heat being generated at a time of light emission, and the device can be made compact. After lights of respective colors are collected and focused, the light is diffused in a vicinity of a film. Therefore, almost all of lights emitted from LED chip groups can be guided to a surface of the film.

10 Claims, 4 Drawing Sheets

IMAGE READING DEVICE

BACKGROUND OF THE INVENTION

1. Field of the Invention

The present invention relates to an image reading device which, while a film on which a plurality of frame images are recorded is conveyed, reads light transmitted through or light reflected by the frame images so as to obtain image data.

2. Description of the Related Art

A technique for forming an image onto a recording material as follows has come to be known in recent years. A frame image recorded on a photographic film is photoelectrically read by a reading sensor such as a CCD. Image processings such as compression and decompression or various types of correction are carried out on the digital image data obtained by reading. An image is recorded onto a recording material by using laser light modulated in accordance with the digital image data which has been subjected to image processing.

In this technique of digitally reading a frame image by a reading sensor such as a CCD, in order to accurately read the image, the frame image is subjected to a preliminary reading (known as prescanning), reading conditions (e.g., the amount of light to be illuminated onto the frame image or the charge accumulating time of the CCD or the like) corresponding to the density and the like of the frame image are determined, and the frame image is then read at the determined reading conditions (which is known as fine scanning).

A halogen lamp, which is often conventionally used for printing exposure and the like, is used as the light source in the above-described image reading system. However, halogen lamps generate a large amount of heat, and as a result, the efficiency of light-emission is poor and an increase in the reading speed is limited.

Namely, halogen lamps are optimal for use as light sources for cases such as printing exposure in which light is transmitted through a negative film and an image is directly printed onto a photographic printing paper. However, in a case such as the above-described system in which an image is read by a CCD (usually, a linear CCD to which filters are mounted so that each of the three primary colors can be sensed), because the color temperature is low, the amount of light of shorter wavelengths (in terms of color, the B (blue) system) is low, and the SN ratio of the read image is poor (in terms of color, there is too much red). For this reason as well, the use of halogen lamps presents problems to the realization of high speed reading.

When a lamp having a high color temperature (e.g., a xenon lamp or a metal halide lamp) is used as the light source, electrical discharge noise is generated, such that high quality reading cannot be carried out.

Thus, use of LEDs as the light source has been proposed. Because LEDs usually emit light of specific colors (blue, green and red), when the LEDs are disposed so as to be grouped together in close proximity to one another, a white light source is formed. Because LEDs generate little heat and the color temperature thereof is high, they are suited for use as the light source of an image reading system.

At the linear CCD used for reading, a color filter is mounted for each line, and each line detects the density (amount of light) of a color.

However, because the aforementioned conventional structure uses LEDs whose light amounts are lower than that of a halogen lamp, the light must be efficiently supplied to the linear CCD. However, a structure in which all of the emitted light is utilized effectively has not yet been realized.

Thus, there are limits to increasing the conveying speed of the film. High speed reading of images is constrained, which leads to a deterioration in work efficiency.

SUMMARY OF THE INVENTION

In view of the aforementioned, an object of the present invention is to provide an image reading device in which there is little heat generated by the light source at the time the light source emits light, images can be read efficiently and quickly and with good image quality, and the device can be made compact.

A first aspect of the invention is an image reading device which, while a film on which an image is recorded is being conveyed, reads the image per predetermined color wavelength, comprising: plural light-emitting element groups in each of which a plurality of light-emitting elements, which emit light at substantially the same wavelength, are aligned linearly along a transverse direction of the film; deflecting means for deflecting optical axes of plural illuminated lights, which have respectively different wavelengths and are emitted from the plural light-emitting element groups, such that the optical axes coincide with one another; a focusing optical system which focuses, in a vicinity of the film, the plural illuminated lights which have passed through the deflecting means; and photoelectric converting elements which receive light which has passed through the film or has been reflected by the film, and subject the light to photoelectric conversion.

In accordance with the first aspect, light-emitting elements of substantially the same wavelength are grouped together and aligned linearly along the transverse direction of the film. Therefore, because all of the light-emitting elements which emit light of a color of a given wavelength can be arranged close together along the transverse direction of the film, a sufficient amount of light can be obtained.

The optical axes of the plural illuminated lights from the plural light-emitting element groups, which illuminated lights have respectively different wavelengths, are made to coincide with one another by the deflecting means. Thereafter, the plural illuminated lights are focused in a vicinity of the film surface by the focusing optical system. The lights of the respective wavelengths which have passed through or been reflected by the film surface are received separately by the photoelectric converting elements.

In this way, the necessary amount of light can be obtained at the photoelectric converting elements, and there are no drawbacks which hinder high speed reading of images.

Because the light emitting elements themselves are small, the overall device can be made more compact than a case in which a halogen lamp or the like is used.

In a second aspect of the present invention, the first aspect further comprises reshaping means for reshaping the illuminated lights, which are emitted from the light emitting elements of the plural light-emitting element groups, into light which is parallel or convergent light.

In the second aspect, when light is focused by the focusing optical system, the light emitted from the light emitting elements is reshaped into, for example, parallel light (or condensed light), so that the light can be used more efficiently.

In a third aspect of the present invention, the first aspect further comprises diffusing means, disposed at a position at which light is focused by the focusing optical system, for diffusing focused light.

In accordance with the third aspect, the diffusing means is disposed at a position at which light is focused by the focusing optical system. As a result, the lights of all of the wavelengths are illuminated onto the surface of the film in a state of being combined together uniformly. Therefore, the color components of the film image can be read accurately by the photoelectric converting elements which correspond to the respective colors.

In a fourth aspect of the present invention, in the third aspect, a degree of diffusion of the diffusing means in a transverse direction of the film is greater than a degree of diffusion of the diffusing means in a conveying direction of the film.

In accordance with the fourth aspect, due to the light being diffused by the diffusing means in the transverse direction of the film, a decrease in the amount of light received by the photoelectric converting elements can be suppressed. However, because it is difficult in actuality to diffuse light in only one direction (the film transverse direction), the diffusing means is designed such that the degree of diffusion thereof in the transverse direction of the film is greater than the degree of diffusion thereof in the conveying direction of the film. In this way, the loss of light can be kept to a minimum.

In a fifth aspect of the present invention, in the first aspect, a direction in which peaks of intensities of lights of respective wavelengths focused by the focusing optical system are aligned, and a direction in which the photoelectric converting elements which receive light of respective wavelengths are aligned, correspond to one another.

In accordance with the fifth aspect of the invention, there is no need to illuminate the light of the plural light-emitting groups uniformly onto the light receiving surfaces of the photoelectric converting elements. For example, if the direction in which the light receiving surfaces which receive the RGB lights are arranged is made to correspond to the direction in which the RGB lights are arranged, it can be ensured that a sufficient amount of light of each color will be received at the photoelectric converting elements.

If the respective colors are completely separated and reach the light receiving surfaces of the photoelectric converting elements corresponding thereto, light of each color can be received even if the photoelectric converting elements are monochrome-type elements.

DESCRIPTION OF THE PREFERRED EMBODIMENTS

Figure 1:
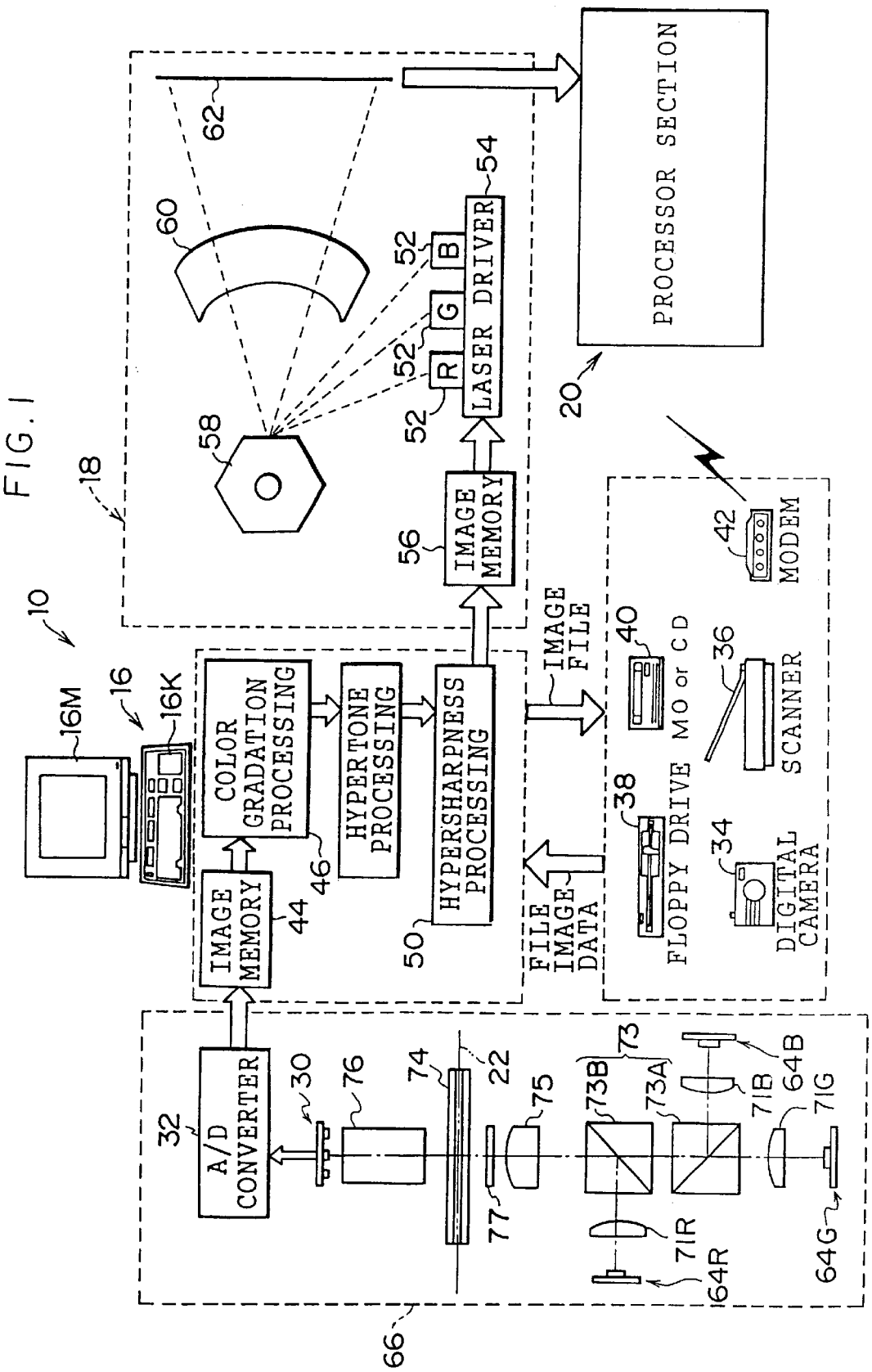
FIG. 1 is a schematic structural view of a digital laboratory system relating to an embodiment of the present invention.
Figure 2:
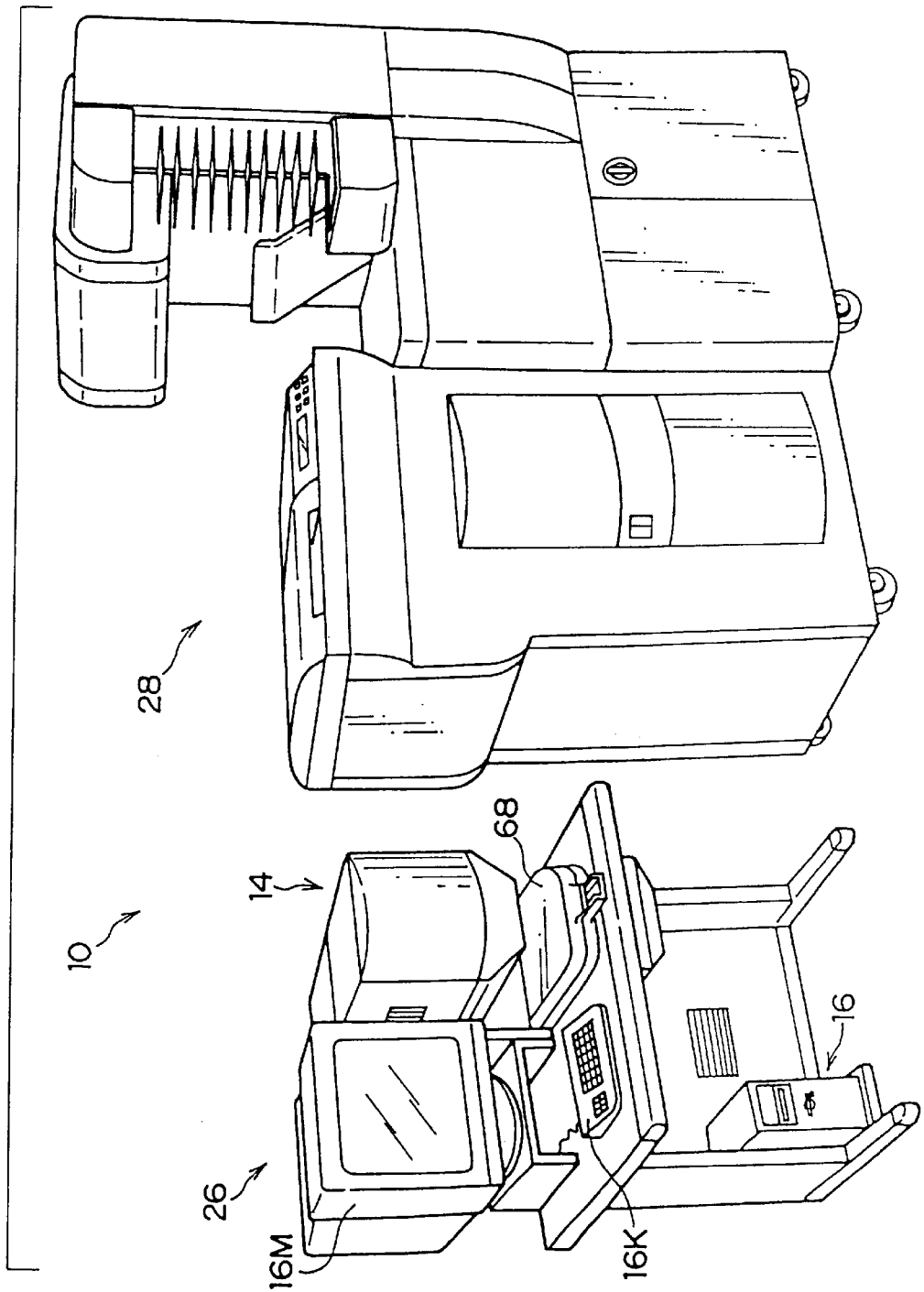
FIG. 2 is a view illustrating the exterior of the digital laboratory system.

FIGS. 1 and 2 illustrate a schematic structure of a digital laboratory system 10 relating to an embodiment of the present invention.

As illustrated in FIG. 1, the digital laboratory system 10 includes a linear CCD 30, an image processing section 16, a laser printer section 18, and a processor section 20. The linear CCD scanner 14, which includes the linear CCD 30 therein, and the image processing section 16 are formed integrally as an input section 26 illustrated in FIG. 2. The laser printer section 18 and the processor section 20 are formed integrally as an output section 28 illustrated in FIG. 2.

The linear CCD scanner 14 reads a frame image recorded on a photographic film such as a negative film or a reversal film or the like. Frame images of, for example, the following types of photographic films can be read: 135 size photographic films, 110 size photographic films, photographic films on which a transparent magnetic layer is formed (240 size photographic films, known as APS films), and 120 size and 220 size (brownie size) photographic films. The linear CCD scanner 14 reads, by a linear CCD 30, a frame image which is the subject of reading, subjects the data obtained by reading to A/D conversion at an A/D converter 32, and outputs the digital image data to the image processing section 16.

In the present embodiment, description will be given of the digital laboratory system 10 in a case in which a 135 size photographic film 22 is used.

The image processing section 16 is structured such that image data (scan image data) outputted from the linear CCD scanner 14 is inputted to the image processing section 16. In addition, the following types of image data can also be inputted to the image processing section 16 from the exterior: image data obtained by photographing by a digital camera 34 or the like; image data obtained by reading an original (e.g., a reflection original) by a scanner 36 (a flatbed-type scanner); image data generated by another computer and stored on a floppy disk drive 38, or an MO drive or a CD drive 40; communications image data received via a modem 42; or the like. (Hereinafter, such image data will be referred to as "file image data".)

In the image processing section 16, the inputted image data is stored in an image memory 44, and is subjected to image processings, such as various types of correction, at a color gradation processing section 46, a hypertone processing section 48, a hypersharpness processing section 50, and the like. The image data which has been subjected to image processing is outputted to the laser printer section 18 as image data for recording. Alternatively, the image processing section 16 may output the image data, which has been subjected to image processing, as an image file to the exterior (e.g., the image processing section 16 may output the image data to a storage medium such as an FD, MO, or CD, or can transmit the image data to another information processing device via a telecommunications line).

The laser printer section 18 is equipped with R, G, B laser light sources 52. A laser driver 54 is controlled such that laser light, which is modulated in accordance with image data for recording which has been inputted from the image processing section 16 (and temporarily stored in an image memory 56), is illuminated onto a photographic printing paper 62, such that the image is recorded onto the photographic printing paper 62 by scanning-exposure (in the present embodiment, by using mainly a polygon mirror 58 and an fθ lens 60). Further, in the processor section 20, the photographic printing paper 62, on which the image was recorded by scanning-exposure in the laser printer section 18, is subjected to color development processing, bleaching fixing processing, washing processing, and drying processing. In this way, the image is formed on the photographic printing paper 62.

Structure of Linear CCD Scanner

Figure 3:
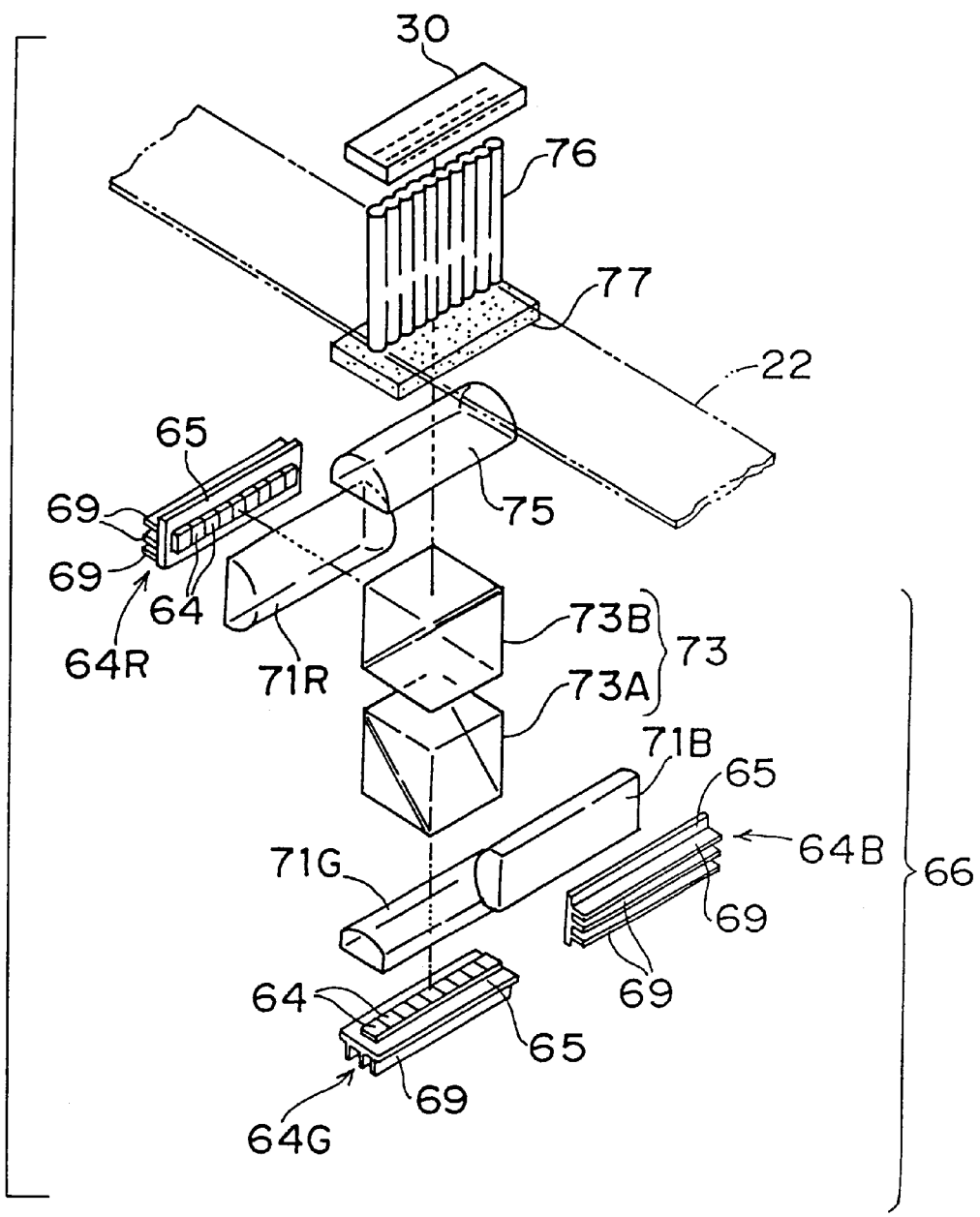
FIG. 3 is a perspective view illustrating a schematic structure of an optical system of a linear CCD scanner.

Next, the structure of the linear CCD scanner 14 will be described. The schematic structure of the optical system of the linear CCD scanner is illustrated in FIG. 3. The optical system is provided with a light source 66 which illuminates light onto the photographic film 22 and is formed from plural LED chips 64 which emit red (R) light, green (G) light and blue (B) light. (Hereinafter, the LED chips 64 will be explained in terms of LED chip groups 64R, 64G, 64B.)

The LED chips 64 are grouped per color, and at each of the LED chip groups 64R, 64G, 64B, the LED chips 64 are arrayed in a single line (or two or more lines) on an aluminum substrate 65 along the transverse direction of the photographic film 22.

Figure 4A:
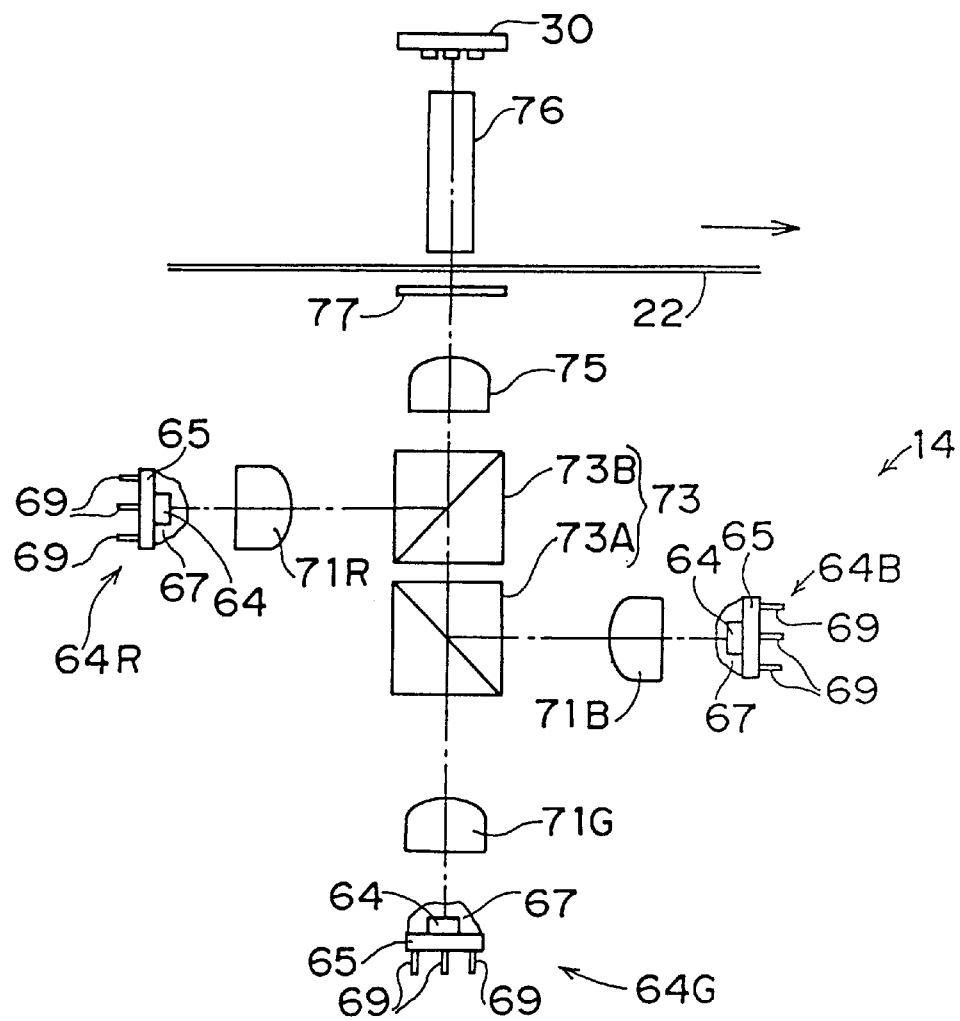
FIG. 4A is a side view illustrating an arrangement of a reading optical system relating to the present embodiment, which optical system includes LED chip groups and a linear CCD.
Figure 4B:
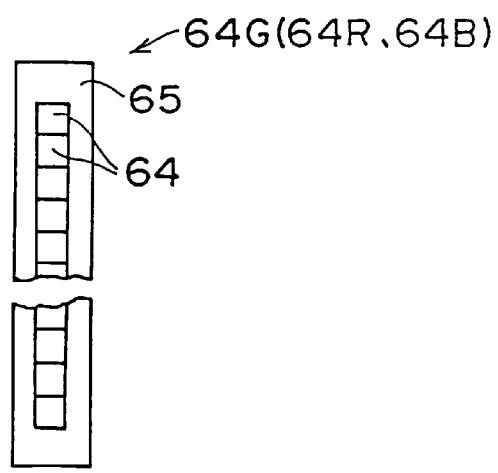
FIG. 4B is a plan view of an LED chip group.

The LED chip groups 64R, 64G, 64B are each coated by a transparent protective film 67 (see FIG. 4A), and are protected such that the light-emitting surfaces thereof are not scratched or otherwise damaged. Further, heat-dissipating fins 69 are mounted to the reverse surface side of the substrate 65, and function to dissipate the heat generated when the LED chip groups 64R, 64G, 64B emit light.

Condenser lenses (cylindrical lenses) 71R, 71G, 71B are disposed at the light-emitting sides of the LED chip groups 64R, 64G, 64B. Dispersed light is converted into parallel light by the condenser lenses 71R, 71G, 71B.

The LED chip group 64G is disposed such that the light-emitting surface thereof opposes the surface to be illuminated of the photographic film 22. A dichroic mirror 73 is disposed on the optical path from the LED chip group 64G to the photographic film 22. The dichroic mirror 73 is formed by two half-mirrors 73A, 73B which are disposed along the optical axis of the LED chip group 64G.

The light emitted from the LED chip group 64G passes through the mirror surfaces of the two half-mirrors 73A, 73B, and is guided toward the photographic film 22. The half-mirrors 73A, 73B function to allow passage of light or to reflect light, depending on their planes of polarization.

The LED chip group 64R is disposed such that the light emitted therefrom is reflected by the mirror surface of the half-mirror 73A which is near the LED chip group 64G, such that the optical axis of the reflected light coincides with the optical axis of the light emitted from the LED chip group 64G. This light emitted from the LED chip group 64R and reflected by the mirror surface of the half-mirror 73A passes through the mirror surface of the half-mirror 73B which is near the photographic film 22.

The LED chip group 64B is disposed such that the light emitted therefrom is reflected by the mirror surface of the half-mirror 73B which is near the photographic film 22, such that the optical axis of the reflected light coincides with the optical axis of the light emitted from the LED chip group 64G.

Thus, the light exiting from the dichroic mirror 73 is light in which the respective colors of RGB are mixed together. This light is focused, by a condenser lens (cylindrical lens) 75, at the position of a diffusing plate 77 which is disposed directly before the photographic film 22. The light is diffused and made uniform by the diffusing plate 77, and is then illuminated onto the surface of the photographic film 22.

Namely, in the present embodiment, the colored lights of the respective colors are collected and focused, and thereafter, are diffused in a vicinity of the photographic film 22. Thus, almost all of the light outputted from the LED chip groups 64R, 64G, 64B can be guided to the surface of the photographic film 22.

A lens unit 76, which focuses the light transmitted through the frame image, and the three-line CCD 30 are disposed in that order along the optical axes of the respective LED chip groups 64R, 64G, 64B at the side of the photographic film 22 positioned and conveyed by a negative carrier 74, which side is opposite the side at which the light source 66 is disposed.

The three-line CCD 30 is formed by linear CCDs in which a plurality of CCD elements which detect light are aligned along the transverse direction of the photographic film 22. In the three-line CCD 30, three linear CCDs are provided in the conveying direction of the film. Filters for receiving light of respectively different wavelengths (RGB) are provided at the lines of the three-line CCD 30.

The light which has passed through the photographic film 22 is focused onto the three-line CCD 30 via the lens unit 76 (which is, for example, a SELFOC lens). (The spot diameter of the focused spot is preferably of an extent such that the CCD elements of the three lines can be illuminated simultaneously. In a case in which the line pitch is 64 $\mu$m, a focused spot diameter of about 180 $\mu$m is preferable.)

The three-line CCD 30 has the function of accumulating charge (one-dimensionally) in accordance with the light that is received successively from the CCD element at one end side of the line to the CCD element at the other end side of the line. When the photographic film 22 is conveyed, the three-line CCD 30 reads the frame image (two-dimensionally) and converts the frame image to an electrical signal.

Next, operation of the present embodiment will be described.

When an operator inserts the photographic film 22 into the film carrier 74 and instructs starting of reading of a frame image by using a keyboard 16K of the image processing section 16, the film carrier 74 starts to convey the photographic film 22 such that prescanning is carried out. Namely, while the photographic film 22 is being conveyed at a relatively high speed, the linear CCD scanner 14 reads not only the frame image, but also the various types of data which are outside of the region at which the image is recorded on the photographic film 22. The read image is displayed on a monitor 16M.

Here, the size of the frame image is ascertained. For example, when there is a panorama-size frame image, light is blocked from reaching the unexposed areas particular to panorama-size images (i.e., the both transverse direction end sides of the photographic film).

Next, on the basis of the results of prescanning, the reading conditions for fine scanning are set for each frame image.

Then, when setting of the reading conditions for fine scanning has been completed for all of the frame images, the photographic film 22 is conveyed in the direction opposite to the direction in which it was conveyed during prescanning, and each of the frame images is fine scanned.

At this time, because the photographic film 22 is being conveyed in the direction opposite to the direction that it was being conveyed during the prescanning, fine scanning is carried out in order from the last frame to the first frame. The conveying speed of the fine scanning is slower than that of the prescanning, and the reading resolution during fine scanning is that much higher. Further, during prescanning, the state of the image (e.g., the aspect ratio of the photographed image; the conditions of photographing such as underexposed, normally exposed, overexposed, or super-overexposed; whether a flash was used; and the like) is ascertained. Thus, the image can be read under appropriate reading conditions.

The light source section 66 which is used in the linear CCD scanner 14 in the present embodiment does not use a halogen lamp or a xenon lamp as do many conventional structures, but rather, uses the LED chip groups 64R, 64G, 64B.

The LED chips 64 of each of the LED chip groups 64R, 64G, 64B are arrayed linearly in very close proximity to one another along the transverse direction of the photographic film 22.

The lights emitted from the LED chip groups 64R, 64G, 64B are converted into parallel lights by the condenser lenses 71R, 71G, 71B, and thereafter, pass through or are reflected by the half-mirrors 73A, 73B of the dichroic mirror 73. The optical axes of the respective lights are made to coincide with one another, and the light is focused onto the diffusing plate 77 by the condenser lens 75.

The focused combined light of the respective colors is diffused and made uniform by the diffusing plate 77, and is illuminated onto the surface of the photographic film 22. At this time, because the diffusing plate 77 and the photographic film 22 are disposed adjacent to one another, it is possible to illuminate only a region which is just about the minimum necessary region of the surface of the photographic film 22.

The light which passes through the photographic film 22 is condensed by the lens unit 76 and is received at the CCD elements of the respective lines of the three-line CCD 30. At the three-line CCD 30, a filter is attached to each line in order for the R light, G light and B light to be received separately. As a result, light amounts of the three colors corresponding to the image can be obtained at the respective lines.

In this way, by using the LED chip groups 64R, 64G, 64B as the light source 66, properties such as a high color temperature and a low amount of light of shorter wavelengths, which are features of LEDs, can be sufficiently exhibited. The SN ratio of the read image is good, and reading at high speed is possible. Namely, the LED chip groups 64R, 64G, 64B are more suited for use as a light source for image reading than other light sources such as halogen lamps.

A drawback of the LED chip 64 is that the amount of light emitted therefrom is insufficient. However, in the present embodiment, the lights emitted from the LED chip groups 64R, 64G, 64B of the respective colors which are formed by plural LED chips are combined together by the dichroic mirror 73 and are focussed at the diffusing plate 77 which is in a vicinity of the surface of the photographic film 22. Therefore, because almost all of the light emitted from the LED chip groups 64R, 64G, 64B can be utilized and there is little loss of light, the drawback of an insufficient amount of light can be overcome.

In the present embodiment, the position at which the light emitted from the LED chips is focused by the condenser lens 75 is the diffusing plate 77. However, the light may directly be focused at a predetermined spot diameter on the surface of the photographic film 22. Further, the diffusing plate 77 may be structured so as to substantially contact the photographic film 22.

Rather than diffusing light uniformly over a range of 360°, it is preferable, from the standpoint of light loss, that the diffusing plate 77 have the characteristic of diffusing light mainly in the transverse direction of the photographic film 22 and hardly diffusing light at all in the conveying direction of the photographic film 22.

In the above-described embodiment, the lights of the three colors are completely combined by the dichroic mirror 73. However, even if the optical axes of the respective colors are offset from one another, the loss of light can be reduced if this offset is estimated in advance, and the arrangement of the lines receiving light of the respective colors at the three-line CCD 30 (i.e., the position of attaching the filters) is made to correspond to the offset of the optical axes.

In the present embodiment, a transmission-type film such as the photographic film 22 is used. However, the present invention is also applicable to the reading of a reflection original.

Further, in the present embodiment, the LED chips forming the LED chip groups 64R, 64G, 64B are of the usual structure in which the LED chips are embedded in a rectangular resin block. However, reflective LED chips may be used wherein a parabolic reflective plate is provided, and the LEDs are disposed at light condensing positions of the parabolic surface. In this case, the light emitted from the LEDs is reflected by the reflective plate and is outputted as substantially parallel light. Thus, this type of LED chips is applicable to structures in which an image is read with the colors separated.

Further, although SELFOC lenses 76R, 76G, 76B are used as the lens unit 76, the lens unit 76 may be an ordinary focusing lens having a spherical surface or an aspheric surface.

The three-line CCD 30 is used as the photoelectric converting elements, but different photoelectric converting elements such as a MOS or the like may be used.

The above-described image reading device relating to the present invention provides excellent effects in that an image can be read efficiently and at high speed and with high image quality with little heat being generated at the time of light emission, and the device can be made compact.

What is claimed is:

1. An image reading device which, while a film on which an image is recorded is being conveyed, reads the image per predetermined color wavelength, comprising:

plural light-emitting element groups in each of which a plurality of light-emitting elements, which emit light at substantially the same wavelength, are aligned linearly along a transverse direction of the film;

deflecting means for deflecting optical axes of plural illuminated lights, which have respectively different wavelengths and are emitted from the plural light-emitting element groups, such that the optical axes coincide with one another;

a focusing optical system which focuses, in a vicinity of the film, the plural illuminated lights which have passed through the deflecting means; and photoelectric converting elements which receive light which has passed through the film or has been reflected by the film, and subject the light to photoelectric conversion.

2. An image reading device according to claim 1, further comprising:

reshaping means for reshaping the illuminated lights, which are emitted from the light emitting elements of the plural light-emitting element groups, into light which is parallel or convergent light.

3. An image reading device according to claim 1, further comprising:

diffusing means, disposed at a position at which light is focused by the focusing optical system, for diffusing focused light.

4. An image reading device according to claim 3, wherein a degree of diffusion of the diffusing means in a transverse direction of the film is greater than a degree of diffusion of the diffusing means in a conveying direction of the film.

5. An image reading device according to claim 1, wherein a direction in which peaks of intensities of lights of respective wavelengths focused by the focusing optical system are aligned, and a direction in which the photoelectric converting elements which receive light of respective wavelengths are aligned, correspond to one another.

6. The image reading device of claim 1, wherein each of the plural light-emitting element groups are disposed to emit light in a non-parallel direction relative to other of the plural light-emitting element groups.

7. The image reading device of claim 6, wherein the plural light-emitting element groups comprise red-light, green-light and blue-light emitting groups.

8. The image reading device of claim 1, further comprising a conveyor which conveys the film at the time of reading the image.

9. The image reading device of claim 8, wherein each of the plurality of line sensors provide photoelectric conversion for light of wavelength corresponding to one color.

10. The image reading device of claim 1, wherein the photoelectric conversion elements comprise a plurality of line sensors.

* * * * *